March 15, 1927.  1,621,132
F. REINBOLD
METHOD AND APPARATUS FOR SEALING FRUIT JARS
Filed Jan. 2, 1925

Inventor
Frank Reinbold,
Attorney

Patented Mar. 15, 1927.

1,621,132

UNITED STATES PATENT OFFICE.

FRANK REINBOLD, OF SHEBOYGAN, WISCONSIN.

METHOD AND APPARATUS FOR SEALING FRUIT JARS.

Application filed January 2, 1925. Serial No. 249.

This invention relates to an improved method and apparatus for sealing fruit jars. Broadly, my method consists in creating a partial vacuum in the jar by means of a hand pump and sealing the opening through which the air is withdrawn by a rubber cap.

Among the many advantages derived through the use of my invention, some of the more important may be briefly enumerated as follows:

First: It conserves the time of the housewife in preparing preserves.

Second: Fruit steaming is not necessary.

Third: The fruit is sealed positively airtight and cannot spoil.

Fourth: The opening through which the air in the fruit jar is withdrawn is sealed automatically by the cap by virture of the suction created by the partial vacuum produced.

Fifth: If the cap does not seal automatically when the partial vacuum is created, this is due to a defect in the rubber washer of the top which is discovered immediately.

Sixth: It eliminates breakage of fruit jars or covers, injury to the hands or the spoiling of the fruit due to broken particles of glass getting into the same, all of which objections are now encountered in employing the methods now commonly employed in preserving fruit.

Other advantages of my invention will be apparent as the nature of my device is better understood, reference being had to the accompanying drawings forming a part of this application and in which.

Figure 1:
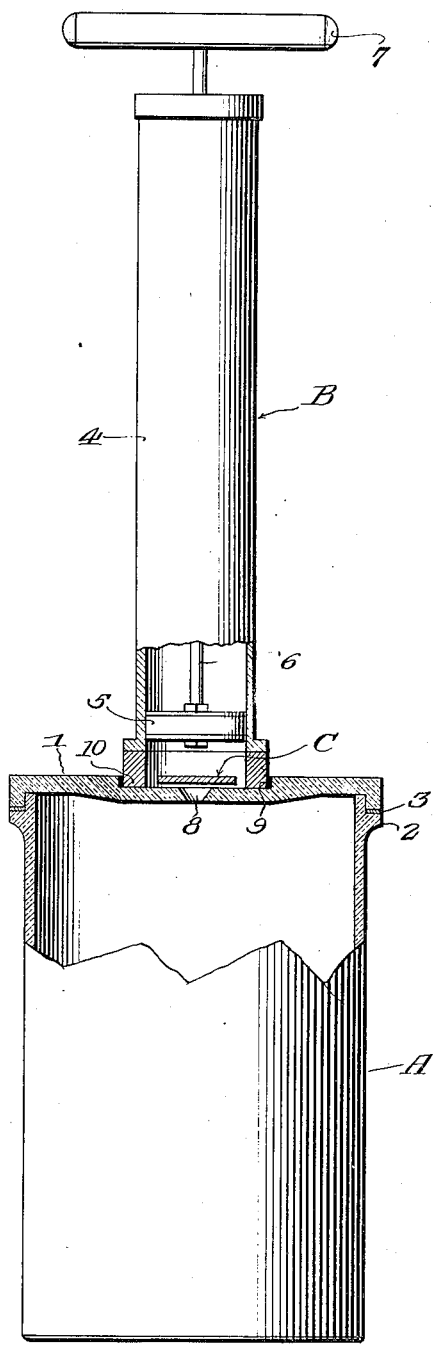
Figure 1 is a longitudinal sectional view illustrating the application of my method of sealing fruit jars.
Figure 2:
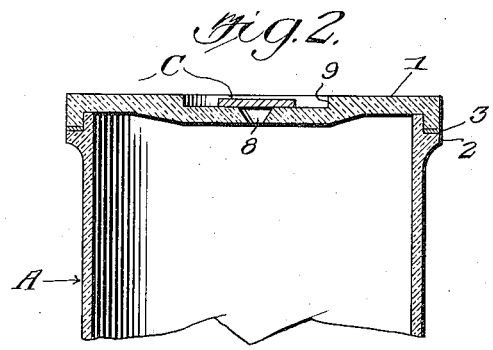
Figure 2 is a similar view of the fruit jar sealed.
Figure 3:
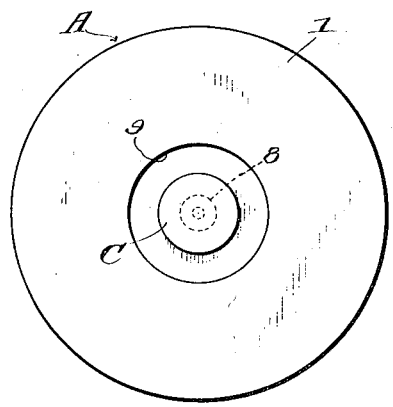
Figure 3 is a plan view.

Referring to the drawings for a more particular description of my invention and in which drawings like parts are designated by like reference characters throughout the several views, A designates the fruit jar or container, B the pump and C my sealing cap. The jar A is provided with the usual cover 1 sealed around its bottom edge 2 by the usual rubber washer 3. The pump B may be of any ordinary or approved construction, comprising the usual barrel 4, piston 5, piston rod 6 and operating handle 7.

In carrying out my invention, the cover 1 of the fruit jar is provided with a centrally disposed outwardly tapered, cone shaped opening 8 adapted to be sealed by the cap C. In practice, the fruit is boiled as usual and after cooling, the jar is filled. The rubber washer is then placed around the neck of the jar and the cover applied. The cap C is then positioned directly over the opening 8 in the cover and the lower end of the pump barrel mounted on the cover over the aforesaid cap. Air is then withdrawn from the jar through the opening 8 by moving the handle 7 back and forth several times when the cap is caused to tightly seat over and positively seal the opening air tight by virtue of the partial vacuum created in the jar.

Attention is invited to the fact that the cover 1 of the fruit jar is provided in its top or upper surface around the opening 8 with a centrally disposed concentric circular recess 9 adapted to receive the lower end 10 of the piston barrel and of slightly larger diameter than the latter. This recess also receives the cap C which when in place is approximately one-thirtysecond ($\frac{1}{32}$) of an inch below the upper surface of the cover. As a result, the rubber sealing caps are protected and do not offer any obstacle in placing the jars one on top of the other.

The lower end of the piston barrel is open and confines the cap C therein, when the lower end 10 of said piston barrel is mounted or seated on the bottom of the circular recess 9. The diameter of the cap C, with respect to the inner diameter of the lower end 10 of the piston barrel permits of the cap C being freely shiftable within and when confined by the lower end 10 of the piston barrel.

Preferably the lower end 10 of the piston barrel conforms in contour, to the shape of the recess 9, and the latter is of slightly greater diamter than the diameter of said lower end 10 to provide for the convenient insertion of the piston barrel in the recess.

Having described my invention, what I claim as new and desire to secure by Letters Patent is:—

1. In combination, a fruit jar cover provided in its top with a circular recess and a central inwardly beveled concentric opening in the bottom of the recess, a relatively thin cap providing an air tight seal for said opening and held in place by virtue of a vacuum created in the jar by a removable means extended into said recess for exhausting the air through said opening, said cap being of less diameter and of less thickness than the depth of said recess and said cap further of a diameter to fit in said means during the formation of the vacuum, said cap mounted on the bottom of the recess, and said opening extending from the bottom of the recess to the inner face of the cover.

2. In combination, a fruit jar cover provided in its top with a circular recess and a central inwardly beveled concentric opening in the bottom of the recess, a relatively thin cap providing an air tight seal for said opening and held in place by virtue of a vacuum created in the jar by a removable means extended into said recess for exhausting the air through said opening, said cap being of less diameter and of less thickness than the depth of said recess and said cap further of a diameter to fit in said means during the formation of the vacuum, said cap mounted on the bottom of the recess, said opening extending from the bottom of the recess to the inner face of the cover, the wall of said recess extending in the same arc throughout and said cap having its edge permanently free of the wall of said recess.

In testimony whereof he affixes his signature.

FRANK REINBOLD.